United States Patent [19]

Hickel et al.

[11] Patent Number: 5,256,749

[45] Date of Patent: Oct. 26, 1993

[54] AMPHIPHILIC POLYMERS CONTAINING SILANE UNITS AND FILM COMPRISING AT LEAST ONE MONOMOLECULAR LAYER PRODUCED THEREFROM

[75] Inventors: Werner Hickel, Mannheim; Donald Lupo, Eppstein/Taunus; Werner Prass, Mainz; Ude Scheunemann, Liederbach; Peter Wilharm, Wiesbaden, all of Fed. Rep. of Germany

[73] Assignee: Hoechst Aktiengesellschaft, Frankfurt am Main, Fed. Rep. of Germany

[21] Appl. No.: 850,581

[22] Filed: Mar. 13, 1992

[30] Foreign Application Priority Data

Mar. 15, 1991 [DE] Fed. Rep. of Germany ....... 4108359

[51] Int. Cl.$^5$ ............... C08F 230/08; C08F 220/54; C08F 220/10
[52] U.S. Cl. ............... 526/279; 526/303.1; 526/328.5
[58] Field of Search ........................... 526/279

[56] References Cited

FOREIGN PATENT DOCUMENTS

| 0336276 | 10/1989 | European Pat. Off. |
| 63-295611 | 12/1988 | Japan . |
| WO83/03165 | 12/1988 | PCT Int'l Appl. |
| WO88/0954-27 | 12/1988 | PCT Int'l Appl. |

Primary Examiner—Joseph L. Schofer
Assistant Examiner—Wu C. Cheng
Attorney, Agent, or Firm—Curtis, Morris & Safford

[57] ABSTRACT

Amphiphilic copolymers containing silanyl groups and composed of derivatives of acrylic and/or methacrylic acid are described, which copolymers are suitable for the production of layer elements by the Langmuir-Blodgett method. Layer elements of this type can be used for optical waveguide systems and for the production of optical filters and for lithographic purposes.

8 Claims, No Drawings

AMPHIPHILIC POLYMERS CONTAINING SILANE UNITS AND FILM COMPRISING AT LEAST ONE MONOMOLECULAR LAYER PRODUCED THEREFROM

BACKGROUND OF THE INVENTION

The invention relates to specific amphiphilic copolymers containing silane units, a film comprising at least one monomolecular layer of these molecules on a solid support (=so-called layer elements), and a process for the preparation of the layer elements and their use.

Ordered layers of organic polymers having long-chain side groups are predominantly prepared by using the Langmuir-Blodgett (LB) method. In this method, molecules are spread on a water surface and the long alkyl side groups are aligned in parallel by decreasing the area per molecule. At a constant pressure, the molecules are applied to a substrate by immersion and withdrawal. Per dipping operation, one monomolecular layer is transferred with retention of its order.

LB films are constructed by using amphiphilic molecules, i.e. molecules having a hydrophilic end (a "head") and a hydrophobic end (a "tail"). In order to achieve higher stability of the LB films, polymeric LB films have also already been prepared.

Preparation of polymeric LB films can be carried out by polymerization of unsaturated amphiphiles after formation of the monomer film. However, organic polymers having long alkyl side chains have also already been used directly for preparation of the layer (WO 83/03165, R. Elbert, A. Laschewsky and H. Ringsdorf, J. Am. Chem. Soc. 107, 4134-4141 (1985)). Copolymer films have also already been described (A. Laschewsky, H. Ringsdorf, G. Schmidt and J. Schneider, J. Am. Chem. Soc. 109, 788-796 (1987)). In these copolymers, one of the comonomers carries at least one long alkyl chain, while the second monomer is water-soluble, or carries at least polar and hydrophilic groups. If such polymer films are intended to be used as resist materials, such as, for example, described by R. Jones, C. S. Winter, R. H. Tredgold, P. Hodge and A. Hoorfar, Polymer 28, 1619-1626 (1987), the problem of insufficient etching stability of these films during plasma etching arises.

However, it is known from resist technology that the etching stability of photoresists in an oxygen plasma can be drastically increased by incorporating silicon compounds. Thus, aliphatic and/or aromatic hydroxyl-carrying polymeric binders have been described which contain silanyl groups in the side chain which, as components of a photosensitive mixture, give this mixture increased resistance to plasma etching (EP-A-0,337,188). The photosensitive layer, which is formed by spin-coating the substrate with a resist solution containing such a binder and compounds from the class of compounds of o-quinone diazides, has a layer thickness of 0.3 to 10 μm. A disadvantage for microelectronic applications, for example high-resolution electron beam lithography, is the relatively high layer thickness of resist films of this type.

Furthermore, Langmuir-Blodgett layers of amphiphilic polysiloxanes are known (Adv. Mater. 3 (1991), 27). It is true that they have good etching resistance in an oxygen plasma, but for many applications they have only insufficient temperature resistance, owing to the siloxane main chain.

Accordingly, the object is to prepare polymers from which Langmuir-Blodgett films can be formed which have improved resistance to temperature and plasma etching.

SUMMARY OF THE INVENTION

The invention relates to amphiphilic copolymers containing silanyl groups and structural units derived from at least one monomer of the formula I

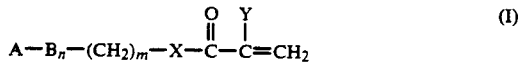

and at least one monomer of the formula II

in which
A— is $CH_3$— or $CF_3$—,
—B— is —$CH_2$— or —$CF_2$—,
n is an integer from 5 to 25,
m is an integer from zero to 12,
—X— is —O—, —$NR^1$— or —Z—, in which
  $R^1$— is H—, $CH_3$—$(CH_2)_n$— or $CF_3$—$(CF_2)_n$—$(CH_2)_m$—
  —Z— is —X'—$(CH_2)_p$—X' or

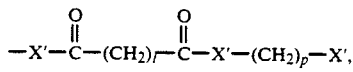

p is an integer from 2 to 10,
l is an integer from 1 to 10 and —X'— is —O— or —$NR^1$—,
—Y is —H, —$CH_3$, —CN, —Cl, —Br or —F,
—D is —$SiR^2(SiR^2{}_3)_2$, —$Si(SiR^2{}_3)_3$, —$SiR^2{}_2$—$SiR^2{}_3$ or —$(SiR^2{}_2)_2$—$SiR^2{}_3$,
  in which $R^2$ is $C_1$-$C_3$-alkyl,
—E— is $C_1$-$C_4$-alkylene and
—L— is

or

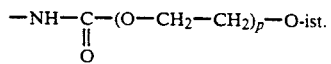

DESCRIPTION OF THE PREFERRED EMBODIMENTS

Preferred structural units derived from monomers of the formula I carry only one long side chain, i.e. the function group —X—, which is —O—, —NH— or —Z— and —X'—, which is —O— or —NH—.

Preferred structural units derived from monomers of the formula II are those in which
—D is —$(SiR^2{}_2)$—$SiR^2{}_3$ and $R^2$ is $C_1$-$C_3$-alkyl, in particular methyl,
—E— is $C_2$-alkylene,
—L— is —NH— or

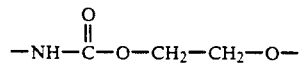

and
—Y is —H or —CH$_3$.

The synthesis of the monomers of the formula I can be carried out by known methods by reaction of a vinylcarboxylic acid or an activated derivative of this carboxylic acid, for example an acid halide, with a long-chain alcohol or amine of the formula IV $$A-B_n-(CH_2)_m-X'-H \quad \text{(IV)}$$

in which A—, —B—, —X'—, m and n have the abovementioned meaning.

Monomers of the formula I containing structural units Z can be prepared first by reaction of a dicarboxylic acid of the formula (V)

$$HOOC-(CH_2)_l-COOH \quad \text{(V)}$$

or of an activated derivative of this dicarboxylic acid, such as, for example, of an acid anhydride, an ester or an acid halide, with an unsaturated alcohol or amine of the formula (VI)

$$\begin{matrix} & Y & O \\ & | & \parallel \\ CH_2= & C-C-X'-(CH_2)_p-X'-H \end{matrix} \quad \text{(VI)}$$

in which l, p, Y and X' have the abovementioned meaning, to give the monoester, followed by condensation with a long-chain alcohol or amine of the formula VII $$A-B_n-(CH_2)_m-X'-H \quad \text{(VII)}$$

in which A, B, X', n and m have the abovementioned meaning.

However, they can also be prepared by the reverse reaction sequence, i.e. by reaction of the dicarboxylic acid of the formula (V) or of one of its reactive derivatives with a long-chain alcohol or amine of the formula (VII), followed by esterification of the intermediate with the unsaturated alcohol of the formula (VI).

The monomers containing silanyl groups of the formula II can be prepared by reaction of a vinylcarboxylic acid or of an activated derivative thereof with a silylating reagent of the formula VIII $$D-E-L'-H \quad \text{(VIII)}$$

in which —L'— is —NR$^1$ or —O—, and R$^1$, D and L have the abovementioned meaning.

Silylating reagents of the formula VIII are described in EP-A-0,336,276.

The monomers of the formula II can furthermore be synthesized by reaction of isocyanato-containing silylating reagents of the formula IX $$D-E-N=C=O \quad \text{(IX)}$$

in which D and E have the abovementioned meaning, with an unsaturated alcohol or amine of the formula VI or of the formula X $$\begin{matrix} CH_2=C-C-O-(CH_2-CH_2-O)_p-H \\ | \quad \parallel \\ Y \quad O \end{matrix} \quad \text{(X)}$$

Copolymers (i.e. ter- and multipolymers) which in addition to the structural units derived from monomers of formula I and II contain at least one structural unit derived from further functional comonomers, for example those leading to radiation-induced crosslinking of the polymers, are also suitable for the purposes of the invention. Further comonomers are also monomers having long alkyl chains, for example monomers such as described by Jones et al., Elbert et al. and Laschewsky et al. in the abovementioned publications and in WO 83/03165. Moreover, hydrophilic, preferably water-soluble, vinyl monomers, such as, for example, itaconic acid, fumaric acid, maleic acid, acrylic acid, cyanoacrylic acid and methacrylic acid or derivatives thereof are suitable as comonomers.

Particular preference is given to those comonomers carrying radiation-crosslinkable units.

The proportion of structural units derived from silanylcontaining monomers of the formula II in the copolymer can be 5 to 98, preferably 30 to 85 and in particular 30 to 70, mol %. The proportion of structural units derived from monomers of the formula I in the copolymer can be 95 to 2, preferably 70 to 15 and in particular 70 to 30, mol %, the proportions of the structural units adding up to a total of 100 mol %.

In copolymers containing structural units derived from at least one monomer each of the formula I and II and at least one further functional comonomer, preferably containing a radiation-crosslinkable unit, the proportion of structural units derived from monomers of the formula I can be 90 to 5, preferably 60 to 20, mol %, the proportion of structural units derived from monomers of the formula II can be 5 to 90, preferably 20 to 60, mol %, and the proportion of structural units derived from further functional comonomers can be 5 to 60, preferably 20 to 40, mol %, the proportions of the structural units adding up to a total of 100 mol %.

The polymerization is preferably carried out as a free-radical polymerization with the addition of a free-radical initiator using conventional methods.

The polymers or films according to the invention can also be mixed with further appropriate components, for example with dyes, amphiphilic crosslinking agents, monomeric or polymeric amphiphiles. The proportion of these additives in such mixtures can be 1 to 80% by weight.

The films are prepared according to the invention by dissolving the organic polymers or mixtures containing preferably 10–100% by weight of the polymers according to the invention in a substantially volatile, water-immiscible solvent and placing (=spreading) them on the surface of an aqueous solution in a film balance. The average area per repeating unit is calculated from the dimension of the surface, the spreading volume and the concentration of the solution. Phase transitions during compression of the molecules can be monitored via the force/area isotherm.

The molecules are compressed by means of a barrier, as a result of which the alkyl chains are aligned substantially perpendicular to the boundary layer with increasing surface density. During compression, a highly ordered monomolecular film, whose constant layer thickness is substantially determined by the chain length of the alkyl side chain of the polymers and their tilting angle (i.e. the angle at which the molecular chains on the water surface are tilted with respect to the normal) is formed at the boundary layer through self-organization of the molecules. The typical thickness of such a film is 0.5–3 nm.

At a constant pressure, the film is removed from the water surface by immersion or withdrawal of a suitable substrate with retention of the order.

In most cases, the subphase used for the monofilm preparation is water or aqueous solutions. However, other liquids having a high surface tension, such as, for example, glycerol, glycol, dimethyl sulfoxide, dimethylformamide or acetonitrile can also be used.

Suitable substrates are any solid, preferably dimensionally stable, substrates made of a variety of materials. The substrates which serve as support can be, for example, transparent or opaque, electrically conducting or insulating. The substrate can be hydrophobic or hydrophilic. The surface of the substrate to which the LB layer is applied can have been made hydrophobic. The surface of the substrate to be coated should be as pure as possible so as not to disturb formation of a thin ordered layer. The presence of surface-active substances on the surface of the substrates to be coated can in particular impair preparation of the layer. It is possible to provide the substrates serving as support with an intermediate layer on the surface to be coated before applying the LB films, in order to improve, for example, adhesion of the film to the substrate.

Examples of materials which can be used for the substrates are metals, such as, for example, gold, platinum, nickel, palladium, aluminum, chromium, niobium, tantalum, titanium, steel and the like. Further suitable materials for the substrates are plastics, such as, for example, polyesters, for example polyethylene terephthalate or polybutylene terephthalate, polyvinyl chloride, polyvinylidene chloride, polytetrafluoroethylene, polystyrene, polyethylene or polypropylene.

In particular semiconductors, such as silicon, germanium or gallium arsenide or else glass, silicon dioxide, ceramic materials or cellulose products are suitable for the substrates. If required, the surface of glass and other hydrophilic substrates can be made hydrophobic in a manner known per se by reaction with alkylsilanes or hexamethyldisilazanes. The selection of the substrate materials depends primarily on the intended application of the layer elements according to the invention. As a rule, for optical elements, transparent substrates are used as supports. If the layer elements according to the invention are used, for example, in electronics or in electrochemical processes, the substrates used are in particular electrically conducting materials, such as metal or metallic surface layers, for example on plastic sheets or glass.

The substrates which serve as carriers for the films according to the invention can, depending on the particular application, have any desired form. For example, they can be in the form of films, sheets, slabs, tapes or even cylinders or can be selected from other forms. In general, the supports will be flat planar substrates, such as, for example, films, sheets, slabs, tapes and the like. The surface of the substrates to be coated is preferably smooth, as is customary for the preparation of LB films. In the case of flat planar substrates, the films according to the invention can be applied to one or both surfaces of the substrate.

The multi-layer structure which can be readily prepared from the polymers according to the invention is distinguished by a small number of defects and good temperature and etching resistance.

Such films on substrates are suitable, for example, for optical waveguide or for the production of filters for optical purposes. Substrates containing films prepared from copolymers according to the invention, which contain radiationcrosslinkable units, are also used for lithographic purposes. Owing to the low critical surface tension, the films are also suitable for improving the friction properties of materials and for the production of protective layers.

The invention is illustrated in more detail by the examples which follow. The solvents used for the synthesis of the monomers are dried by conventional methods (for example by molecular sieve). The polymerizations are carried out in an inert gas atmosphere, for example of nitrogen.

Example 1

Synthesis of the disilane monomer 1

$$\begin{array}{c} CH_3\ CH_3 \\ | \quad | \\ CH_3-Si-Si-CH_2-CH_2-NH_2\ + \\ | \quad | \\ CH_3\ CH_3 \end{array}$$

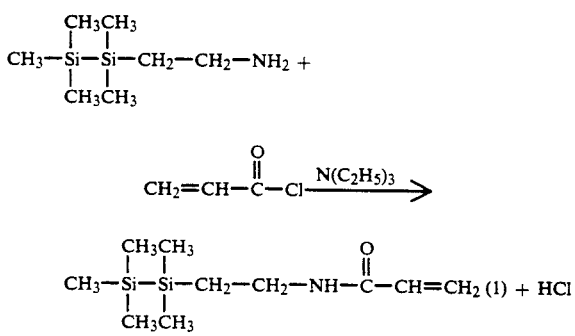

$$\begin{array}{c} CH_3\ CH_3 \qquad\qquad O \\ | \quad | \qquad\qquad\qquad || \\ CH_3-Si-Si-CH_2-CH_2-NH-C-CH=CH_2\ (1)\ +\ HCl \\ | \quad | \\ CH_3\ CH_3 \end{array}$$

5.8 of 2-pentamethyldisilylethylamine hydrochloride are dissolved in about 100 ml of dichloromethane and extracted twice by shaking with 100 ml each of 2M NaOH. The organic phase is dried with $Na_2SO_4$, and the solvent is removed in vacuo. 50 mg of 2,6-di-tert.-butyl-p-cresol are added to the remaining clear liquid, and the mixture is dissolved in 40 ml of anhydrous tetrahydrofuran (dichloromethane, dioxane and toluene are also suitable solvents), the solution is cooled to 2° C., 4.5 ml of anhydrous triethylamine are added, and 2.7 ml of acryloyl chloride, dissolved in 30 ml of anhydrous tetrahydrofuran, are metered in at 2° C. over a period of 30 minutes. The ice bath is then removed, and the reaction mixture, after reaching a temperature of 20°-25° C., is stirred for another 2 hours. The reaction mixture, after addition of 100 ml of dichloromethane, is then extracted twice with 50 ml each of 1M HCl, the organic phase is dried with $Na_2SO_4$ and the solvent is removed in vacuo. The remaining solid is purified by recrystallization from n-hexane, giving 4.95 g (80% of theory) of a white powder.

$^1$H NMR (100 MHz, $CDCl_3$):

$\delta = -0.1$–$0.1$ (m, 15H, Si—$CH_3$), 0.7–1.0 (m, 2H, $SiCH_2$), 3.1–3.5 (m, 2H, N—$CH_2$), 5.2–5.8 (m, 2H, —NH— and =CH—CO), 5.8–6.4 (m, 2H, =$CH_2$).

Example 2

Synthesis of the disilane monomer 2

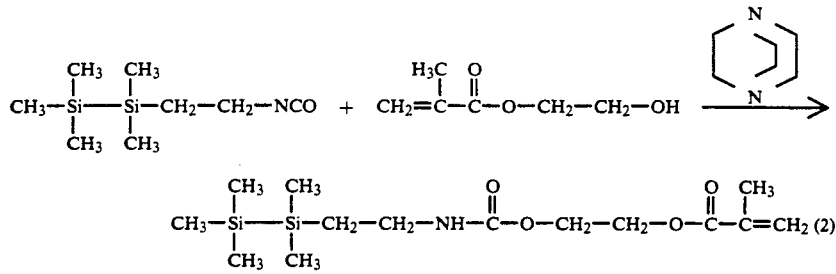

6.04 g of the disilane isocyanate are dissolved together with 35 mg of 1,4-diazabicyclo[2.2.2]octane in 50 ml of dichloromethane. The solution is cooled in an ice/sodium chloride bath to 0° C, and a mixture of 4.25 ml of 2-hydroxyethyl methacrylate, 5 mg of 2,6-di-tert.-butyl-p-cresol and 25 ml of dichloromethane is metered in over a period of 15 minutes. After addition is complete, the reaction mixture is heated to the boiling temperature over a period of 30 minutes, and boiled at the boiling temperature for 20 hours. After cooling to a temperature of 20°–25° C., the reaction mixture is extracted twice by shaking with 100 ml each of 1M HCl and water, the organic phase is dried with $Na_2SO_4$, and the solvent is removed in vacuo. 50 mg of 2,6-di-tert.-butyl-p-cresol are added to the remaining oily substance, and the mixture is purified by column chromatography (eluent: n-hexane/ethyl acetate 3:1 (volume-ratio)). This gives 15 g (65% of theory) of a colorless oil.

$^1$H NMR (100 MHz, $CDCl_3$): $\delta = -0.1$–$0.1$ (m, 15H, Si—$CH_3$), 0.7–1.0 (m, 2H, $SiCH_2$), 1.7–1.9 (m, 3H, C—$CH_3$), 3.1–3.5 (m, 2H, N—$CH_2$), 4.2–4.3 (s, 4H, O—$CH_2$—$CH_2$—O—CO), 4.4–4.7 (m, 1H, NH), 5.4–6.2 (m, 2H, =$CH_2$).

Example 3

Free-radical copolymerization of the disilane monomer 1 with N-octadecylacrylamide 2.0 g of N-octadecylacrylamide and 0.622 g of the disilane monomer 1 are dissolved in 20 ml of tetrahydrofuran, and 10.2 mg of azobisisobutyronitrile are added. The solution is placed in a three-necked flask equipped with reflux condenser (with gas-discharge tube and bubble counter), thermometer and gas introduction tube, and the mixture is flushed with nitrogen at a temperature of 20°–25° C. for one hour. The reaction mixture is then heated to the boiling temperature and refluxed at the boiling temperature for 7 hours with continuous stirring (magnetic stirrer). The polymer is precipitated by pouring the reaction solution cooled to a temperature of 20°–25° C. into methanol, and the product is filtered off with suction. In order to free it from residual monomer, it is dissolved two more times in tetrahydrofuran and precipitated by pouring into methanol, giving 1.9 g of a white fine-particle material which is insoluble in methanol and soluble in tetrahydrofuran. Determination of the molecular weight by means of gel permeation chromatography gives an $M_w$ of 4,800 and an $M_n$ of 2,600 dalton (polystyrene calibration). Elemental analysis (71.4% by weight of C, 11.7% by weight of H, 4.6% by weight of N, 5.5% by weight of O) gives a copolymer composition of 1 part of long-chain substituted monomer and 0.45±0.1 part of disilane monomer.

Example 4

Free-radical copolymerization of the disilane monomer 1 with N-octadecylacrylamide 2.0 g of N-octadecylacrylamide and 1.244 g of the disilane monomer 1 are dissolved in 20 ml of tetrahydrofuran, and 10.2 mg of azobisisobutyronitrile are added. The solution is placed in a three-necked flask equipped with reflux condenser (with gas-discharge tube and bubble counter), thermometer and gas introduction tube, and the mixture is flushed with nitrogen at room temperature for one hour. The reaction mixture is then heated to the boiling temperature and refluxed at the boiling temperature for 7 hours with continuous stirring. The polymer is precipitated by pouring the reaction solution cooled to a temperature of 20°–25° C. into methanol, and the product is filtered off with suction. In order to free it from residual monomer, it is dissolved two more times in tetrahydrofuran and precipitated by pouring into methanol, giving 1.1 g of a white fine-particle material which is insoluble in methanol and soluble in tetrahydrofuran. Determination of the molecular weight by means of gel permeation chromatography gives an $M_w$ of 4,600 and an $M_n$ of 2,500 dalton (polystyrene calibration). Elemental analysis (68.4% by weight of C, 11.1% by weight of H, 4.9% by weight of N, 5.4% by weight of O) gives a copolymer composition of 1 part of long-chain substituted monomer and 0.9±0.2 part of disilane monomer.

Example 5

Free-radical copolymerization of the disilane monomer 1 with N-octadecylacrylamide 2.0 g of N-octadecylacrylamide and 2.49 g of the disilane monomer 1 are dissolved in 20 ml of tetrahydrofuran, and 10.2 mg of azobisisobutyronitrile are added. The solution is placed in a three-necked flask equipped with reflux condenser (with gas-discharge tube and bubble counter), thermometer and gas introduction tube, and the mixture is flushed with nitrogen at a temperature of 20°–25° C. for one hour. The reaction mixture is then heated to the boiling temperature and refluxed at the boiling temperature for 7 hours with continuous stirring. The polymer is precipitated by pouring the reaction solution cooled to 20°–25° C. into methanol, and the product is filtered off with suction. In order to free it from residual monomer, it is dissolved two more times in tetrahydrofuran and precipitated by pouring into methanol, giving 2.4 g of a white fine-particle material which is insoluble in methanol and soluble in tetrahydrofuran. Determination of the molecular weight by means of gel permeation chromatography gives an $M_w$ of 5,700 and an $M_n$ of 4,300 dalton (polystyrene calibration). Elemental analysis (61.9% by weight of C, 11.1% by weight of H, 5.4% by weight of N) gives a copolymer composition of 1 part of long-chain substituted monomer and 2.4±0.1 part of disilane monomer.

Example 6

Free-radical copolymerization of the disilane monomer 1 with N-octadecylacrylamide 1.0 g of N-octadecylacrylamide and 3.11 g of the disilane monomer 1 are dissolved in 20 ml of tetrahydrofuran, and 5.1 mg of azobisisobutyronitrile are added. The solution is placed in a three-necked flask equipped with reflux condenser (with gas-discharge tube and bubble counter), thermometer and gas introduction tube, and the mixture is flushed with nitrogen at a temperature of 20°-25° C. for one hour. The reaction mixture is then heated to the boiling temperature and refluxed at the boiling temperature for 7 hours with continuous stirring. The polymer is precipitated by pouring the reaction solution cooled to a temperature of 20°-25° C. into methanol, and the product is filtered off with suction. In order to free it from residual monomer, it is dissolved two more times in tetrahydrofuran and precipitated by pouring into methanol, giving 4.2 g of a white fine-particle material which is insoluble in methanol and soluble in tetrahydrofuran. Determination of the molecular weight by means of gel permeation chromatography gives an $M_w$ of 10,000 and an $M_n$ of 6,200 dalton (polystyrene calibration). Elemental analysis (57.8% by weight of C, 10.6% by weight of H, 5.6% by weight of N) gives a copolymer composition of 1 part of long-chain substituted monomer and 5.1±0.6 part of disilane monomer.

Example 7

Free-radical copolymerization of the disilane monomer 2 with N-octadecylacrylamide 0.93 g of N-octadecylacrylamide and 0.50 g of the disilane monomer 2 are dissolved in 30 ml of tetrahydrofuran, and 4.4 mg of azobisisobutyronitrile are added. The solution is placed in a three-necked flask equipped with reflux condenser (with gas-discharge tube and bubble counter), thermometer and gas introduction tube, and the mixture is flushed with nitrogen at a temperature of 20°-25° C. for one hour. The reaction mixture is then heated to the boiling temperature and refluxed at the boiling temperature for 6 hours with continuous stirring. The polymer is precipitated by pouring the reaction solution into methanol, and the product is filtered off with suction. In order to free it from residual monomer, it is dissolved two more times in tetrahydrofuran and precipitated by pouring into methanol, giving 0.58 g of a white fine-particle material which is insoluble in methanol and soluble in tetrahydrofuran. Determination of the molecular weight by means of gel permeation chromatography gives an $M_w$ of 5,400 and an $M_n$ of 2,500 dalton (polystyrene calibration). Elemental analysis (65.2% by weight of C, 10.3% by weight of H, 4.2% by weight of N) gives a copolymer composition of 1 part of long-chain substituted monomer and 1.3±0.3 part of disilane monomer.

Example 8

Free-radical copolymerization of the disilane monomer 2 with N-octadecylacrylamide 0.93 g of N-octadecylacrylamide and 0.99 g of the disilane monomer 2 are dissolved in 30 ml of tetrahydrofuran, and 4.4 mg of azobisisobutyronitrile are added. The solution is placed in a three-necked flask equipped with reflux condenser (with gas-discharge tube and bubble counter), thermometer and gas introduction tube, and the mixture is flushed with nitrogen at a temperature of 20°-25° C. for one hour. The reaction mixture is then heated to the boiling temperature and refluxed at the boiling temperature for 7.5 hours with continuous stirring. The polymer is precipitated by pouring the reaction solution cooled to a temperature of 20°-25° C. into methanol, and the product is filtered off with suction. In order to free it from residual monomer, it is dissolved two more times in hot tetrahydrofuran and precipitated by pouring into methanol, giving 0.46 g of a white fine-particle material which is insoluble in methanol and soluble in hot tetrahydrofuran. Determination of the molecular weight by means of gel permeation chromatography could not be carried out, due to the low solubility at 20° C. Elemental analysis (62.1% by weight of C, 10.5% by weight of H, 4.1% by weight of N) gives a copolymer composition of 1 part of long-chain substituted monomer and 1.3±0.1 part of disilane monomer.

Example 9

Free-radical copolymerization of the disilane monomer 2 with N-octadecylacrylamide 0.93 g of N-octadecylacrylamide and 1.99 g of the disilane monomer 2 are dissolved in 30 ml of tetrahydrofuran, and 4.4 mg of azobisisobutyronitrile are added. The solution is placed in a three-necked flask equipped with reflux condenser (with gas-discharge tube and bubble counter), thermometer and gas introduction tube, and the mixture is flushed with nitrogen at a temperature of 20°-25° C. for one hour. The reaction mixture is then heated to the boiling temperature and refluxed at the boiling temperature for 7.5 hours with continuous stirring. The polymer is precipitated by pouring the reaction solution cooled to a temperature of 20°-25° C. into methanol, and the product is filtered off with suction. In order to free it from residual monomer, it is dissolved two more times in hot tetrahydrofuran and precipitated by pouring into methanol, giving 1.0 g of a white fine-particle material which is insoluble in methanol and soluble in hot tetrahydrofuran. Determination of the molecular weight by means of gel permeation chromatography could not be carried out, due to the low solubility at 20° C. Elemental analysis (59.0% by weight of C, 10.0% by weight of H, 4.39% by weight of N) gives a copolymer composition of 1 part of long-chain substituted monomer and 1.9±0.4 part of disilane monomer.

Example 10

Film preparation by the Langmuir-Blodgett method

A microscope slide made of glass (76 mm×26 mm) is cleaned by the following method:

The glass is placed in a freshly prepared mixture of four parts of conc. $H_2SO_4$ and one part of 30% $H_2O_2$, whose temperature is 60° C., for one hour, rinsed off with water of high purity and cleaned in an alkaline, surfactant-free cleaning solution, for example ®Extran AP 11 (conc. 2-4 g/l) for 15 minutes at a temperature of 50° C. by means of ultrasound. The glass is then thoroughly rinsed with water of high purity (18 mohm, free of particles) and dried in a warm air stream. The glass is then made hydrophobic by treating it with hexamethyldisilazane vapor (for 10 minutes at a temperature of 70° C.).

Multilayers comprising the polymer prepared in Example 3 are transferred by the Langmuir and Blodgett method to the glass support by spreading 0.2 cm$^3$ of a solution of 9.3 mg of the polymer in 10 cm$^3$ of a 9:1 (volume ratio) mixture of methylene chloride and tetrahydrofuran on an aqueous subphase at a subphase temperature of 10° C. in a Langmuir film balance. By reducing the monofilm-covered water surface, the pressure is adjusted to 20 mN/m and kept constant at this value. The support is now immersed perpendicularly from above through the water surface into the film balance (immersion rate: 20 mm/min.) and after a short pause (10 sec.) at the lower turnaround point again withdrawn (withdrawal rate: 20 mm/min.). Each immersion and also each withdrawal process transfers one monolayer to the support. By repeating the dipping process several times after a wait of one minute each at the upper turnaround point, a total of 10 double layers are transferred. The transfer ratios are around 90%. Even when 50 and more monolayers are transferred, optically clear, transparent films are obtained.

Films are also obtained from the polymers prepared in Examples 4, 5 and 6, using the same procedure. The transfer conditions for these polymers are as follows:

|  | Polymer from Example: | | |
|---|---|---|---|
|  | 4 | 5 | 6 |
| Subphase temperature: | 10° C. | 10° C. | 10° C. |
| Pressure: | 20 mN/m | 20 mN/m | 20 mN/m |
| Transfer ratio: | 90% | 70% | 80% |

Example 11

Ellipsometric measurements of the layer thickness and the refractive index

Silicon chips (40 mm × 10 mm) are cut from a silicon wafer and cleaned as follows:
1. Treatment for 1 hour in a freshly prepared mixture comprising one part of 30% $H_2O_2$ and four parts of conc. $H_2SO_4$ whose temperature is 60° C. They are then rinsed with water of high purity.
2. Immersion in an $NH_4F$-buffered HF solution for 30 seconds, followed again by rinsing using water of high purity. After this treatment, the silicon chips are hydrophobic (contact angle with water: 75° C.).

Layers made from the polymers prepared in Examples 3, 4, 5 and 6 are transferred to the silicon chip by the Langmuir and Blodgett method under the same conditions as in Example 10. Specimens containing 10, 30, 50 and 70 monolayers, respectively, of the individual polymers are prepared, and the layer thicknesses and the refractive index of the LB films are measured ellipsometrically.

|  | Results of the measurements: Polymer from Example: | | | |
|---|---|---|---|---|
|  | 3 | 4 | 5 | 6 |
| Refractive index at 633 nm: | 1.499 | 1.486 | 1.454 | 1.477 |
| Layer thickness in nm/monolayer: | 1.990 | 1.460 | 0.698 | 0.830 |

Example 12

Measurements of heat stability

Silicon chips (40 mm × 10 mm) are cut from a thermally oxidized silicon wafer (thickness of the oxide layer: 160 nm) and placed in a freshly prepared mixture comprising one part of 30% $H_2O_2$ and four parts of conc. $H_2SO_4$ at a temperature of 60° C. for one hour. After thorough rinsing using water of high purity, the chip is treated in an ultrasound bath with an alkaline, surfactant-free cleaning solution, for example ®Extran AP 11 (conc. 2-4 g/l) at a temperature of 50° C. for 15 minutes, thoroughly rinsed with water of high purity and dried in a warm air stream. It is then made hydrophobic by means of a treatment with hexamethyldisilazane vapour (10 minutes at a temperature of 70° C.).

Coating by the LB method with 8 monolayers each is carried out as described in Example 10, using the polymers prepared in Examples 3, 4, 5 and 6.

The coated carrier is heated in a special apparatus at a linear temperature gradient (0.5° C./sec.). During the heating-up process, the thickness of the LB film is measured by the intensity of a perpendicularly polarized laser beam (633 nm) reflected by the specimen. The temperature at which the first change in layer thickness takes place is 140° C. in layers made from the polymer prepared in Example 3, 130° C. in layers made from the polymer prepared in Example 4, 120° C. in layers made from the polymer prepared in Example 5, and 130° C. in layers made from the polymer prepared in Example 6. (For comparison: in LB layers made from 22-tricosenic acid, this temperature is 70° C.)

Example 13

Measurements of the critical surface tension

Silicon chips (40 mm × 10 mm) are cleaned as in Example 11 and coated as in Example 11 with eight monolayers each made from the polymers prepared in Examples 3, 4, 5 and 6. Droplets of a liquid from the series of n-alkanes ($C_9H_{20}$–$C_{16}H_{34}$) are placed on the surface of the transferred layers, and the contact angles of the droplets with the surface are measured. The critical surface tension is determined from these contact angles by the method of Zisman (W. A. Zisman, Adv. Chem. Ser., 43 (1964), 1-51 and Phys. Chem. Surfaces, A. W. Adamson, New York 1982). The following values are found:

| Polymer from Example | Crit. surface tension [mN/m] |
|---|---|
| 3 | 21.7 |
| 4 | 23.8 |
| 5 | 25.2 |
| 6 | 25.2 |

(For comparison: A polyethylene surface gives a value of 31 mN/m in this measurement).

What is claimed is:

1. An amphiphilic copolymer containing silanyl groups and structural units derived from at least one monomer of the formula I $$A-B_n-(CH_2)_m-X-\underset{\underset{O}{\|}}{C}-\underset{\underset{Y}{|}}{C}=CH_2 \qquad (I)$$

and at least one monomer of the formula II $$D-E-L-\underset{\underset{O}{\|}}{C}-\underset{\underset{Y}{|}}{C}=CH_2 \qquad (II)$$

in which

A— is $CH_3$— or $CF_3$—,
—B— is —$CH_2$— or —$CF_2$—,
n is an integer from 5 to 25,
m is an integer from zero to 12,
—X— is —O—, —$NR^1$— or —Z—, in which
$R^1$— is H—, $CH_3$—$(CH_2)_n$— or $CF_3$—$(CF_2)_n$—$(CH_2)_m$—
—Z— is —X'—$(CH_2)_p$—X' or $$-X'-\underset{\underset{O}{\|}}{C}-(CH_2)_l-\underset{\underset{O}{\|}}{C}-X'-(CH_2)_p-X',$$

p is an integer from 2 to 10,
l is an integer from 1 to 10 and
—X'— is —O— or —$NR^1$—,
—Y is —H, —$CH_3$, —CN, —Cl, —Br or —F,
—D is —$SiR^2(SiR^2{}_3)_2$, —$Si(SiR^2{}_3)_3$, —$SiR^2{}_2$—$SiR^2{}_3$ or —$(SiR^2{}_2)_2$—$SiR^2{}_3$,
in which $R^2$ is $C_1$-$C_3$-alkyl,
—E— is $C_1$-$C_4$-alkylene and
—L— is $$-O-, -NR^1-, -NH-\underset{\underset{O}{\|}}{C}-X'-(CH_2)_p-X'-$$

or $$-NH-\underset{\underset{O}{\|}}{C}-(O-CH_2-CH_2)_p-O-$$

2. A copolymer as claimed in claim 1, wherein —X— is —O—, —NH— or —Z—, —X'— is —O— or —NH—, —D is —$(SiR^2{}_2)$—$SiR^3{}_3$, $R_2$ is methyl, —E— is $C_2$-alkylene, —L— is —NH— or $$-NH-\underset{\underset{O}{\|}}{C}-O-CH_2-CH_2-O-$$

and —Y is —H or —$CH_3$.

3. A copolymer as claimed in claim 1, wherein the proportion of structural units derived from silanyl-containing monomers of the formula II is 5 to 98% by weight and the proportion of structural units derived from monomers of the formula I is 95 to 2% by weight, the proportions of the structural units adding up to a total of 100% by weight.

4. A copolymer as claimed in claim 3, wherein the proportion of structural units derived from silanyl-containing monomers of the formula II is 30 to 85% by weight and the proportion of structural units derived from monomers of the formula I is 70 to 15% by weight.

5. A copolymer as claimed in claim 1, comprising structural units derived from at least one monomer each of the formula I and II and at least one further functional comonomer.

6. A copolymer as claimed in claim 5, wherein the structural units derived from a further functional comonomer carry radiation-crosslinkable units.

7. A copolymer as claimed in claim 5, wherein the proportions of structural units derived from monomers of the formula I is 90 to 5% by weight, the proportions of structural units derived from monomers of the formula II is 5 to 90% by weight and the proportions of structural units derived from further functional comonomers is 5 to 60% by weight, the proportions of the structural units adding up to 100% by weight.

8. A copolymer as claimed in claim 7, wherein the proportions of structural units derived from monomers of the formula I is 60 to 20% by weight, the proportions of structural units derived from monomers of the formula II is 20 to 60% by weight and the proportion of structural units derived from further functional comonomers is 20 to 40% by weight.

* * * * *